United States Patent
Cuvelier et al.

(10) Patent No.: US 8,763,626 B2
(45) Date of Patent: Jul. 1, 2014

(54) VALVE FOR THE VENTING CIRCUIT OF A LIQUID TANK

(75) Inventors: Vincent Cuvelier, Brussels (BE); Emmanuel Stiers, Vandelicourt (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 221 days.

(21) Appl. No.: 12/965,296

(22) Filed: Dec. 10, 2010

(65) Prior Publication Data

US 2011/0155751 A1 Jun. 30, 2011

(30) Foreign Application Priority Data

Dec. 24, 2009 (FR) ...................................... 09 59588

(51) Int. Cl.
*F16K 24/04* (2006.01)
(52) U.S. Cl.
USPC ............................................ 137/202; 137/43
(58) Field of Classification Search
USPC .................................................. 137/202, 43
See application file for complete search history.

(56) References Cited

U.S. PATENT DOCUMENTS

| | | | | |
|---|---|---|---|---|
| 5,535,772 | A * | 7/1996 | Roetker et al. ................... | 137/43 |
| 5,738,132 | A * | 4/1998 | Zakai et al. ...................... | 137/43 |
| 5,960,817 | A | 10/1999 | Johansen et al. | |
| 5,971,002 | A | 10/1999 | Turpin et al. | |
| 6,286,539 | B1 * | 9/2001 | Nishi et al. ..................... | 137/202 |
| 6,443,177 | B2 * | 9/2002 | Romanek ....................... | 137/202 |
| 6,450,192 | B1 * | 9/2002 | Romanek ....................... | 137/202 |
| 6,708,713 | B1 * | 3/2004 | Gericke .......................... | 137/43 |
| 6,901,943 | B2 * | 6/2005 | Yamada et al. ................ | 137/202 |
| 2001/0003990 | A1 * | 6/2001 | Romanek ....................... | 137/202 |
| 2004/0003844 | A1 * | 1/2004 | Yamada et al. ................ | 137/202 |
| 2006/0213553 | A1 * | 9/2006 | Mills et al. ........................ | 137/43 |
| 2006/0213555 | A1 * | 9/2006 | Miura et al. ................... | 137/202 |
| 2007/0000542 | A1 * | 1/2007 | Johansen ....................... | 137/202 |
| 2009/0000668 | A1 * | 1/2009 | Roscher et al. ............... | 137/202 |

FOREIGN PATENT DOCUMENTS

| | | |
|---|---|---|
| EP | 0803671 A1 | 10/1997 |
| EP | 1702785 A1 | 9/2006 |
| JP | 200700327417 A | 12/2007 |
| WO | WO 2006/125758 A1 | 11/2006 |
| WO | WO 2008/028894 A1 | 3/2008 |
| WO | WO 2010/092055 A1 | 8/2010 |

OTHER PUBLICATIONS

U.S. Appl. No. 13/147,697, filed Aug. 3, 2011, Volodia Naydenov, et al.

* cited by examiner

*Primary Examiner* — John Rivell
*Assistant Examiner* — R. K. Arundale
(74) *Attorney, Agent, or Firm* — Oblon, Spivak, McClelland, Maier & Neustadt, L.L.P.

(57) ABSTRACT

Ventilation valve for a liquid tank comprising:
  an housing comprising a side wall provided with ventilation openings, a cover provided with a ventilation aperture which may be connected to a venting circuit of the tank, and a base pierced with at least one drainage aperture; and
  a float capable of closing off the ventilation aperture, such float being able to slide vertically inside the housing depending on the level of liquid therein,
the valve also comprising a drainage chamber located underneath the housing in which the valve slides, the chamber also comprising at least one drainage aperture that is not aligned with the drainage aperture of the base of the housing.

14 Claims, 3 Drawing Sheets

VALVE FOR THE VENTING CIRCUIT OF A LIQUID TANK

CROSS-REFERENCE TO RELATED APPLICATIONS

This application claims priority to French application No. 09.59588 filed on Dec. 24, 2009, the whole content of this application being incorporated herein by reference for all purposes.

TECHNICAL FIELD

The present invention relates to a valve for the venting circuit of a liquid tank, in particular a fuel tank with which a motor vehicle may be equipped.

BACKGROUND

Liquid tanks, particularly fuel tanks for motor vehicles, are currently generally fitted, amongst other things, with a venting circuit. This circuit allows air to be introduced into the tank in the event of underpressure (in particular to compensate for the volume of liquid consumed) or allows gases contained in the tank to be removed in the event of overpressure (particularly in the event of overheating). This circuit also allows the gases that have to be discharged into the atmosphere to be routed and possibly filtered for the purpose of meeting the increasingly strict environmental requirements in this area.

The venting circuit includes, in a known manner, at least one valve that prevents, as far as possible, liquid from escaping the tank in the event of the tank being turned upside down or at an excessively high tilt angle. This venting valve must provide a rapid and reliable response when its operating conditions arise, but with minimal sensitivity to transient phenomena such as in particular very high flow rates, overpressure in the tank or low-amplitude waves. It must also ensure that there is minimal liquid carried over into the canister (or the chamber containing a substance, usually activated carbon, which adsorbs the fuel vapors) in normal operation and when filling, in order to avoid saturating said canister and making the decontamination of the gases discharged into the atmosphere ineffective. This phenomenon is generally called LCO (liquid carry over) in the jargon of the field.

Many venting valves employ a float having an upper needle or tip which closes off an aperture for connecting the tank to the venting circuit (known as the ventilation aperture). One way of reducing the risk of LCO with this type of valve is that described in Application WO 2006/125758 in the name of the Applicant, the content of which is incorporated by reference in the present application, and which consists in providing the valve with baffles (preferably, at least one internal and one external baffle) so as to create a chicane or tortuous path for the vapor stream. For this purpose the baffles and the housing of the valve are provided with openings in their upper part and preferably the openings of the internal and external baffles are aligned and arranged crosswise relative to those of the main housing. This geometry prevents direct flow between the various partitions and therefore creates an optimal labyrinth effect.

Another way of solving this problem, which is described in Application WO 2008/028894 also in the name of the Applicant, and the content of which is also incorporated by reference in the present application, consists in providing the lateral surface of the head of the float with a baffle and in adapting the internal geometry of the housing and of the head of the float so that the vapor streams from the tank impact on this baffle before going through the ventilation aperture.

Although effective, these two solutions have the major drawback of complicating the geometry of the valve and therefore of increasing the costs linked to its manufacture. Moreover, they both focus on the geometry of the pathway for the vapors in the upper part of the valve, between the ventilation openings (openings in the housing of the valve) and the ventilation aperture.

However, liquid fuel which has entered into the valve through these ventilation openings and which is lead down to the base of the valve by the aforementioned devices, must be able to be drained/purged to prevent liquid fuel from accumulating in the valve. Moreover, fuel must also be able to penetrate into (and be discharged from) the valve, preferably through its bottom portion since its operating principle is precisely linked to the fact that the float must be able to respectively open/close the ventilation aperture depending on the level of fuel in the tank.

Hence, apertures known as drainage apertures are generally positioned at a low point of the valve, often in the base thereof. In order to optimize the purge operation, it is advisable to increase the size of these apertures. But by doing this, there is a risk of creating a direct path for the liquid fuel which can therefore very rapidly rise into the housing, along the float and reach the ventilation aperture before the float has effectively blocked the ventilation aperture. This situation also leads to LCO.

If the drainage apertures are smaller, said apertures may no longer fulfill their drainage role. If the liquid fuel is not correctly discharged from the valve, the risk of LCO increases. In the extreme situation where the liquid fuel goes back in through the upper openings of the valve more quickly than it is purged through the drainage apertures, a situation may occur in which the float is blocked in the closed position. The valve therefore no longer makes it possible to ventilate the tank. Therefore it is generally necessary to find a compromise.

The idea behind the invention is to no longer have to make a compromise between the purge performance of the valve and the prevention of LCO, by creating a chamber in the base of the valve, the geometry of which is such that it makes it possible to prevent liquid fuel from following a direct path from the base of the valve to the top thereof (i.e., up to the ventilation aperture).

In order to do this, this chamber is provided, at its base, with at least one drainage aperture in staggered rows relative to (not aligned with) the drainage apertures of the housing in which the float slides, which effectively makes it possible to prevent the creation of a direct path for the ascending liquid fuel while retaining relatively large purge apertures in order to enable a rapid drainage of the valve housing and therefore a more effective ventilation.

Therefore, it is no longer necessary to find a drainage/LCO performance compromise. These two aspects can therefore be optimized simultaneously.

It should be noted that the expression "drainage aperture" is understood to mean an aperture having dimensions such that it can effectively discharge (drain) liquid. Typically, the area of such an aperture is greater than or equal to that of an aperture with a diameter of 2 mm, preferably greater than or equal to the area of an aperture with a diameter of 3 mm. Thus the apertures of a filter which have a diameter of less than 1 mm do not correspond to this definition. Document JP 2007/327417 describes a valve that has such a filter at the base of a chamber located underneath the housing in which the float slides, the objective of which is to stop the air bubbles that were entrained by the fuel during filling of the tank. Such a valve probably exhibits effective protection against the waves of liquid fuel that may give rise to LCO but, on the other hand, it is difficult to drain considering the size of the filter apertures. In fact, small holes protect against LCO on closure of the valve, but increase the risk of LCO on reopening of the valve.

SUMMARY

The present invention hence relates to a ventilation valve for a liquid tank comprising:
- a housing comprising a side wall provided with ventilation openings, a cover provided with a ventilation aperture which may be connected to a venting circuit of the tank, and a base pierced with at least one drainage aperture; and
- a float capable of closing off the ventilation aperture, said float being able to slide vertically inside the housing depending on the level of liquid therein;

said valve also comprising a drainage chamber located underneath the housing in which the float slides, said chamber also comprising at least one drainage aperture that is not aligned with the drainage aperture of the base of the housing.

BRIEF DESCRIPTION OF THE DRAWINGS

The invention is illustrated in a non-limiting way by the appended FIGS. 1 to 3, where.

DETAILED DESCRIPTION

Figure 1:
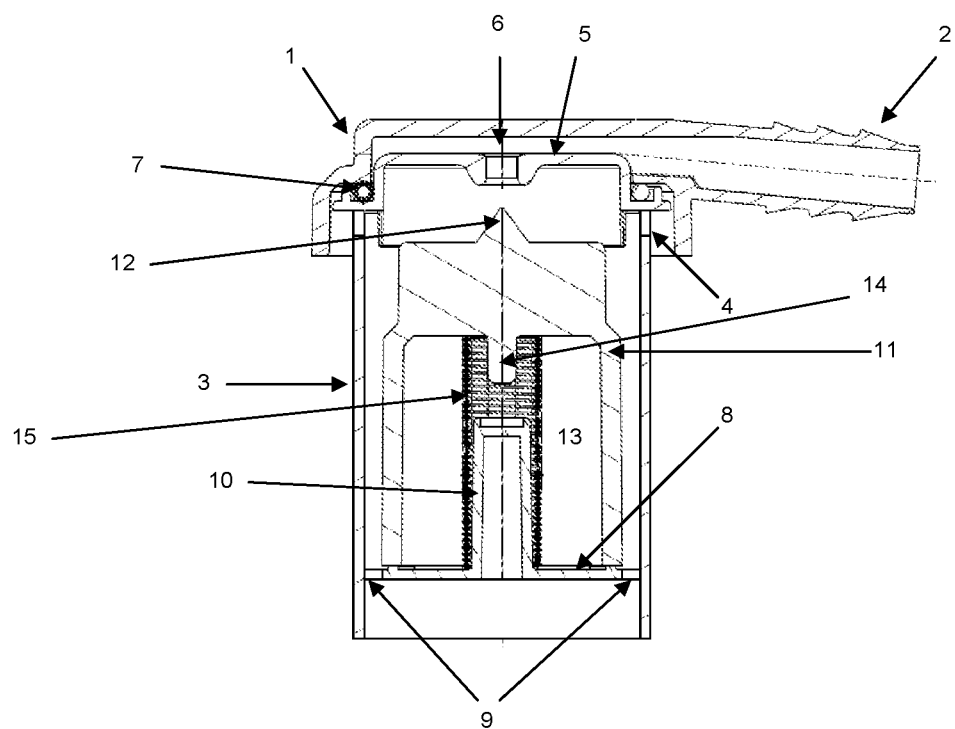
FIG. 1 represents an axial cross section through a valve according to the prior art.

The valve according to the invention is intended for the venting circuit of a tank, which may contain any liquid but preferably: a liquid onboard a vehicle. In particular, the liquid may be a fuel, a pollution-control additive, a brake fluid or a lubricant. More particularly, the liquid is a fuel. The tank may be intended for any use, especially for equipping a vehicle and more especially still for equipping a motor vehicle.

The valve according to the invention comprises a float, that is to say a solid or hollow part generally comprising a body and a head provided with a needle intended for closing off the ventilation aperture. Preferably, the head and the body are made of one piece or they are directly fixed to each other so that they cannot move relatively one to another.

It also comprises a main housing of any shape, internally adapted to the sliding of the float. For this purpose, the housing usually has a constant internal cross section, at least in the part where the body of the float has to be able to slide. In particular, at least in this part, it is internally cylindrical.

The external (lateral) shape of the float is obviously matched to that of the inside of the housing in which it has to be able to slide. Therefore, the float generally has a cylindrical external shape.

The main housing of the valve according to the invention comprises a base which is used as a support for the float when the latter is in the low position. Advantageously, it is a plate or dish comprising at least one drainage aperture. Preferably, the base of the housing comprises several apertures. When the liquid level rises in the tank, this liquid penetrates the valve through these apertures, forces the float upwards and also causes the needle to close off the aperture located in the head of the valve.

The main housing of the valve according to the invention also has a side wall comprising, preferably in its upper part, one or more ventilation openings allowing the gases to flow from the inside of the tank to the inside of the valve and from there, through the venting aperture, to the venting circuit), and therefore, providing the degassing/venting function of the valve. The term "gas" is understood in particular to mean the external air that has to be introduced into the tank or the gas mixtures contained in the tank, the removal of which has to be made possible. In the case of a fuel tank, these gas mixtures comprise essentially air, and fuel vapor.

Positioning gas flow openings in the upper part of the housing very substantially reduces the possible impact on these openings of the liquid level and of its movements, thus allowing venting even in certain critical situations. This impact may also, when required, be reduced by the use of at least one (internal and/or external) baffle placed facing some of the openings, and preferably all of them, and/or a baffle on the float, as described in the aforementioned applications in the name of the Applicant.

The housing of the valve according to the invention also comprises a cover provided with a ventilation aperture intended to be connected to a venting circuit of the tank. For this purpose, the valve advantageously comprises a coupling integrated into a head that delimits, with the cover of the housing, a ventilation chamber, said coupling having a geometry suitable for being connected to a ventilation duct.

The essential feature of the invention lies in the presence, under the housing, of an additional chamber (known as a drainage chamber) comprising at its base or on its side wall (the first alternative being preferred), at least one drainage aperture that is not aligned with the one in the base of the housing, and through which the liquid must pass in order to be able to reach said aperture in the base of the housing. Thus a tortuous path is created that makes the progression of a wave of fuel in the valve more difficult. Preferably, the drainage openings are free (not obstructed by any valve or other device whatsoever).

The apertures are preferably sized and positioned so as to obtain satisfactory drainage of the valve without however increasing LCO by the phenomenon described above.

As regards the aperture(s) in the base of the housing, their area is preferably at most equal to 20 mm$^2$; this value (which corresponds to a circular opening with a diameter of 5 mm) gives good results in practice. These apertures are preferably located at the periphery in order not to be closed off by the float when it is in the low position. Hence, preferably, the aperture(s) in the chamber are preferably located at the centre of the base of the chamber. The apertures in the base of the housing are preferably at least 3, or even 4, in number. In practice, a total drainage area of between 60 and 100 mm$^2$, with holes that are circular in the main, gives good results.

As regards the base of the chamber, it preferably comprises a single aperture, preferably located at its centre and preferably having an area of at least 50 mm$^2$. The combination of such an aperture with 4 apertures of around 20 mm$^2$ at the periphery of the base of the housing gives good results.

One way of achieving the invention in practice consists in extending the side wall of the housing below the base and in sealing the bottom of this extension with a plate provided with at least one aperture that is not aligned with the aperture(s) of the base; the extension, the base and the plate delimiting the drainage chamber in this variant of the invention. Another way consists in choosing, as wall of the chamber, a coverless hollow part that is fastened underneath the base of the housing. However, generally the side wall and the base of the housing are already two separate parts and consequently these variants involve the use of an additional third part.

Hence, according to another preferred variant of the invention, the base of the housing itself creates (integrates) the volume of the chamber, optionally together with an extension of the housing.

In this variant, the base is preferably in the shape of a hollow disc, i.e., two horizontal circular plates connected together by at least one vertical coupling element. This coupling may consist of a vertical plate, preferably oriented along one of the diameters of the two circular plates, and preferably being interrupted in the neighborhood of the drainage aperture of the base of the housing, where appropriate (i.e., if the plate crosses said aperture). Alternatively or in addition, it may be at least one annular section that connects at least one portion of the circumference of the two circular plates. The combined use of a diametral plate and of an annular section makes it possible to obtain a rigid, high-performance part. The annular section may not be continuous in the case of a part molded as a single piece (since then the part would not be able to be removed from the mold), but that is of no consequence since when the base is mounted in the housing, the side wall thereof can at least partly constitute the side wall of the chamber.

In this variant, the side wall of the housing is preferably provided with a shoulder in its lower part that acts as a stop for the mounting of the base.

Very particularly preferably, at the place where the base is mounted in the housing, this housing comprises openings which cooperate with fastening lugs present on the base.

The valve according to the invention allows a liquid tank to be vented, both in normal operation and when filling. It does not have, as such, the function of preventing ingress of liquid in the event of a vehicle rolling over or being excessively tilted (ROV or Roll-Over Valve function). This function is therefore, where appropriate, preferably provided by independent devices or by additional means combined with the valve.

To provide this function, the means generally employed consist of a heavy ball and/or a preloaded spring.

According to one preferred variant of the invention, the ROV function is provided by a preloaded spring which is borne by (fastened to) a protuberance of the base of the housing and a protuberance present in a hollow relief within the float, respectively.

This variant is advantageously combined with that according to which the base of the housing integrates the drainage chamber. According to one particularly preferred variant, the base of the housing comprises two horizontal circular plates connected together by at least one vertical coupling element as defined above, the upper disc being produced as one piece with a vertical protuberance, which is preferably hollow and is used as a support for a preloaded spring. It advantageously has a substantially cylindrical shape, optionally narrowing at its end to facilitate and secure the insertion of the spring.

The constitutive elements of the valve may be made of any material. Preferably, they are based on a thermoplastic (apart from the spring, where appropriate, which is preferably made of metal). In this case, it is obviously convenient to choose the material or materials in such a way that they withstand the operating stresses. Preferably, the chosen materials are inert with respect to the liquids with which they have to be in contact, in particular inert with respect to fuels.

In particular in the case in which the liquid tank is a fuel tank made of plastic, most of the constitutive elements of the valve according to the invention are also made of plastic.

In the case of a plastic fuel tank, and in particular one based on HDPE, good results have been obtained with valves that include a head based on HDPE (so as to be able to be welded to the wall of the tank and in particular to the perimeter of an opening therein), and a housing and a float made of POM (polyoxymethylene) or PBT (polybutylene terephthalate).

These elements are therefore preferably produced by injection molding.

Figure 2:
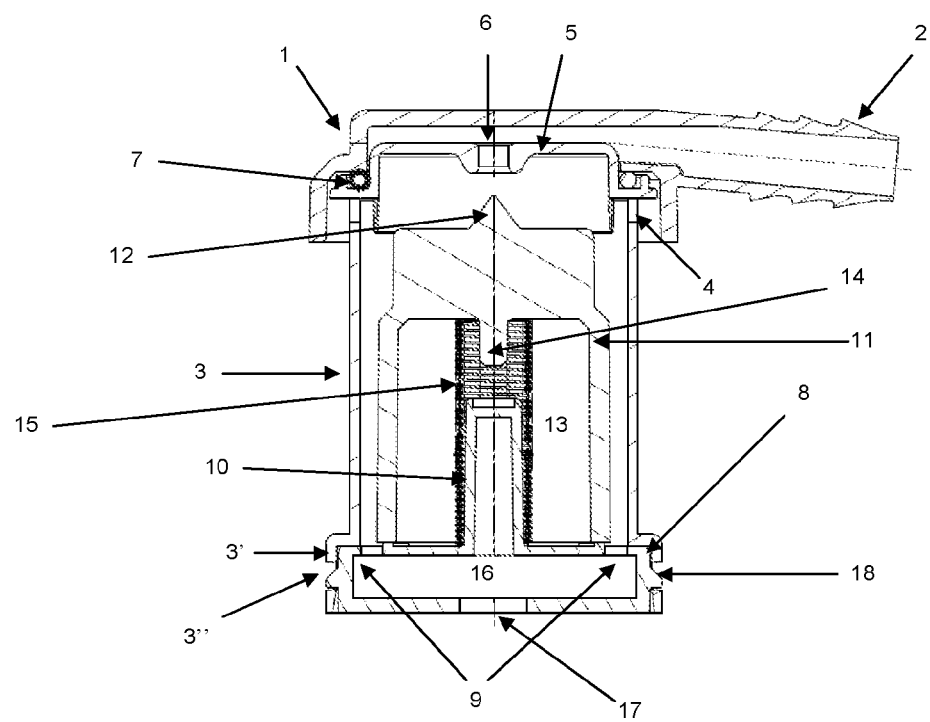
FIG. 2 represents an axial cross section through a valve according to one variant of the invention.
Figure 3:
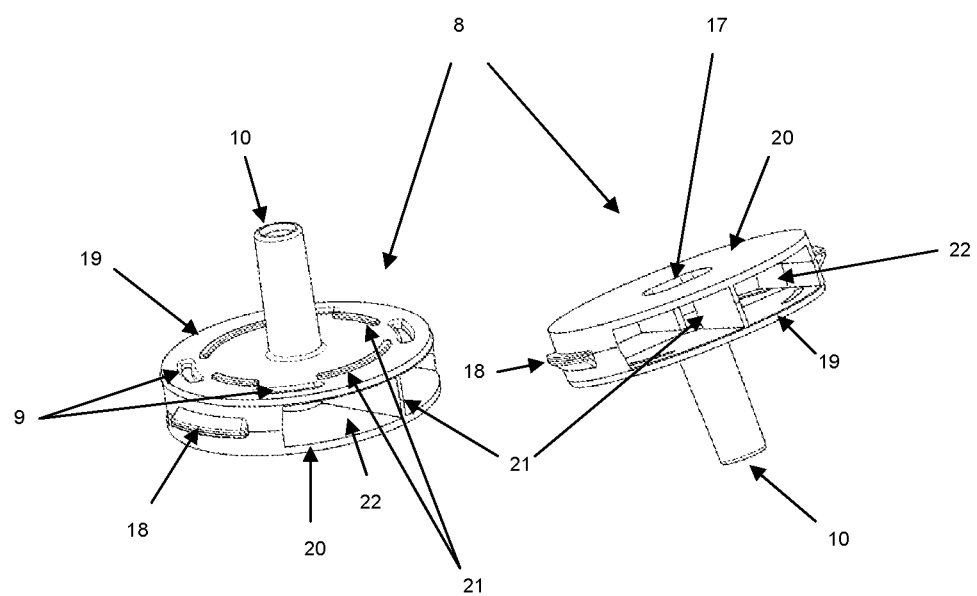
FIG. 3 represents two views of the chamber of the valve from the preceding figure.

The invention is illustrated in a non-limiting way by the appended FIGS. 1 to 3, where:

FIG. 1 represents an axial cross section through a valve according to the prior art;

FIG. 2 represents an axial cross section through a valve according to one variant of the invention; and FIG. 3 represents two views of the chamber of the valve from the preceding figure.

In these figures identical numbers denote identical or similar components.

The valves illustrated in FIGS. 1 and 2 comprise:
  a head (1) that integrates a coupling (2) intended to couple the valve to a ventilation duct (not shown);
  a housing comprising a side wall (3) provided with ventilation openings (4), a cover (5) comprising a ventilation aperture (6) and to which the head (1) is fastened by clip-fastening, an O-ring (7) being placed between the two to ensure a leaktight connection and a base (8) comprising drainage apertures (9) and a protuberance (10);
  a float (11) comprising a needle (12) capable of closing off the ventilation aperture (6) in the top position of the float (11), and also a hollow relief (13), from the ceiling of which a protuberance (14) extends;
  a preloaded spring (15) fastened to the protuberances (10, 14) and which has the role of providing the ROV function as defined above.

The valve according to the prior art (FIG. 1) has a flat base (8) that has the shape of a plate from which the protuberance (10) extends for supporting the spring (15), and the side wall (3) of its housing is simply extended below the base (8) to protect the valve from waves (as described in patent EP 0803671 in the name of the Applicant).

On the other hand, the valve according to the invention (FIG. 2) has a shoulder (3') in the lower part of the side wall of its housing, which acts as a stop for the base part (8) which this time has the shape of a hollow disc that integrates a chamber (16) according to one variant of the invention, and that bears the protuberance (10) for supporting the spring (15). The chamber (16) comprises, at its base, a drainage aperture (17) with a diameter of around 8 mm. Its dimensions are: total height: 61 mm; diameter of the shaft: 35 mm, 40 mm in the bottom; diameter of the head: 44 mm. The diameter of the shaft is linked to the float and to the gap to be maintained between the two, the diameter of the head (outer skirt) is linked to the diameter of the shaft. The shoulder in the base should not increase the total diameter of the valve; it is therefore preferably smaller than the diameter of the head.

Below the shoulder (3'), the side housing comprises openings (3") intended to receive fastening lugs (18) of the base part (8) to enable the attachment of the two parts.

The base part (8) according to this variant of the invention is illustrated in greater detail in FIG. 3, where it can be seen that it in fact consists of a hollow part, obtained by injection molding and that it is essentially constituted of two circular plates (19, 20) connected by a diametral plane (21) interrupted in its central portion so as to allow the fuel to flow as easily as possible through the lower drainage aperture (17) of the chamber, and also by annular sections comprising the fastening lugs (18).

The upper drainage apertures (9) of the chamber (which are in fact the drainage apertures of the housing) are themselves 4 in number, evenly distributed over the circular plate (19), of elongated shape (it should be noted in this regard that a circular shape gives better results) and having an area of around 20 mm². The plate (19) furthermore bears reliefs (21), the purpose of which is to act as bearing points for the float (if this was placed directly on a large flat surface there would be a risk of the float bonding to its base due to the fuel) and also side openings (22) necessary for releasing the part from the mold and which mean that, at their location, the chamber (16) is in fact delimited laterally by the side wall of the housing (3), which makes it possible to lighten the valve.

The valves illustrated in FIGS. 1 and 2 were tested under identical conditions and the LCO measured with the valve from FIG. 2 was around 4 times lower than that measured with the valve from FIG. 1 for identical drainage/ventilation performances.

The valve according to the invention provides the ventilation role: it allows gases to enter and exit the tank so as to prevent overpressures and underpressures inside the tank. It must fulfill this role while providing good liquid/vapor separation of the fuel, i.e., it must contain the liquid fuel inside the tank as much as possible. When a wave arises, the float reacts to this and closes the ventilation aperture before the liquid fuel can pass through this aperture. When the wave recedes, the float drops back down and reopens the ventilation aperture. The present invention, due to the presence of larges purge apertures in the base of the valve, makes it possible to ensure that the drainage of the valve takes place rapidly when the wave recedes. This is important, because the longer the valve is closed, the more the pressure risks rising in the tank. Furthermore, due to the staggered arrangement of the purge holes in the lower part of the valve, a wave is prevented from being able to penetrate directly through the base of the valve and reach the ventilation aperture before the float reacts and closes off this aperture. Thus, this helps to improve the LCO performance of the valve.

Should the disclosure of any patents, patent applications, and publications which are incorporated herein by reference conflict with the description of the present application to the extent that it may render a term unclear, the present description shall take precedence

The invention claimed is:

1. A ventilation valve for a liquid tank comprising:
   a housing comprising a side wall provided with ventilation openings, a cover provided with a ventilation aperture which is optionally connected to a venting circuit of the tank, and a base pierced with at least one first drainage aperture; and
   a float capable of closing off the ventilation aperture, said float being able to slide vertically inside the housing depending on the level of liquid therein, said valve also comprising a drainage chamber located underneath the housing in which the float slides, said chamber also comprising at least one second drainage aperture that is not aligned with the first drainage aperture of the base of the housing,
   wherein the draining chamber is integrated into the base of the housing, the base being in a shape of a hollow disc, the base comprising a first circular plate and a second circular plate connected together by a vertical plate oriented along one of the diameters of the first and second circular plates.

2. The valve according to claim 1, additionally comprising at least one baffle positioned facing at least one of the ventilation openings and/or a baffle on the float.

3. The valve according to claim 1, wherein the side wall of the housing is comprises an extensions below the base and is sealed in the bottom by a plate provided with the at least one aperture that is not aligned with the aperture(s) of the base; the extension, the base and the plate delimiting the drainage chamber.

4. The valve according to claim 1, wherein the drainage chamber is delimited by a coverless hollow part that is fastened underneath the base of the housing.

5. The valve according to claim 1, wherein the side wall of the housing is provided with a shoulder in its lower part that acts as a stop for the mounting of the base.

6. The valve according to claim 1, wherein, at the place where the base is mounted in the housing, this housing comprises openings which cooperate with fastening lugs present on the base.

7. The valve according to claim 1, wherein the upper disc is made as a single part with a vertical protuberance that acts as a support for a preloaded spring that provides a roll-over valve function.

8. A fuel tank having a wall made of HDPE or high-density polyethylene, equipped with the valve according to claim 1, comprising a head based on HDPE welded to the perimeter of an opening in the wall of the tank, and a housing and a float made of polyoxymethylene or polybutylene terephthalate.

9. The valve according to claim 1, wherein the drainage chamber is devoid of any floating device capable of closing the second draining aperture.

10. The valve according to claim 9, wherein the second draining aperture is staggered in row relative to the first draining aperture of the housing.

11. The valve according to claim 10, wherein the second draining aperture is a central hole arranged in a bottom circular plate of the drainage chamber.

12. The valve according to claim 9, wherein the second draining aperture is a central hole arranged in a bottom circular plate of the drainage chamber.

13. The valve according to claim 1, wherein the second draining aperture is staggered in row relative to the first draining aperture of the housing.

14. The valve according to claim 1, wherein the second draining aperture is a central hole arranged in a bottom circular plate of the drainage chamber.

* * * * *